April 25, 1939.  V. N. ALBERTSON  2,155,379

TRACTOR HITCH

Filed Aug. 1, 1938   2 Sheets-Sheet 1

Inventor

VICTOR N. ALBERTSON

By Andrew E. Carlsen

Attorney

April 25, 1939.    V. N. ALBERTSON    2,155,379
TRACTOR HITCH
Filed Aug. 1, 1938    2 Sheets-Sheet 2

Inventor
VICTOR N. ALBERTSON
By Andrew E. Carlsen
Attorney

Patented Apr. 25, 1939

2,155,379

UNITED STATES PATENT OFFICE 2,155,379

TRACTOR HITCH

Victor N. Albertson, St. Louis Park, Minn., assignor to Minneapolis-Moline Power Implement Company, Minneapolis, Minn., a corporation of Delaware Application August 1, 1938, Serial No. 222,387

14 Claims. (Cl. 280—33.10)

My invention relates to improvements in tractor hitches or draw bars for forming draft connections to an implement.

The primary object of the invention is to provide a hitch including means whereby the actual draft connection to the implement may be shifted transversely with respect to the tractor and in response to the angularly extended pulling force of the implement when making a turn. The hitch is particularly suited for use on light tractors of the type employing a single traction wheel. It has been found that the usual rigid draw bar hitch will under some circumstances actually prevent a turn being made with this type of tractor, especially when a turn is made in the direction which places the traction wheel at the inner side of the arc. The shifting hitch presented by this invention therefore provides for shifting the draft connection transversely behind the traction wheel, and laterally thereof toward the inside of the turn so that the pull of the implement serves to aid in the steering of the tractor around the turn instead of opposing it.

Another object is to provide a hitch of this character which may be readily applied to the tractor and to a point thereon most favorable for its use, and in which an assembly of parallel bars are arranged to give a straight line shifting action of the hitch connection to maintain a substantially constant spacing between tractor and implement as well as to facilitate the proper positioning of the draft connection at all times.

These and other more detailed and specific objects will be disclosed in the course of the following specification, reference being had to the accompanying drawings, in which Fig. 1 is a plan view of a tractor and the frontal portion of an implement showing the present hitch connected therebetween, and showing the positions assumed by the parts when a turn is made to the right. This view also indicates, in dot dash lines, the positions to which the hitch and implement move, with respect to the tractor, when a turn is made to the left.

Figure 1:
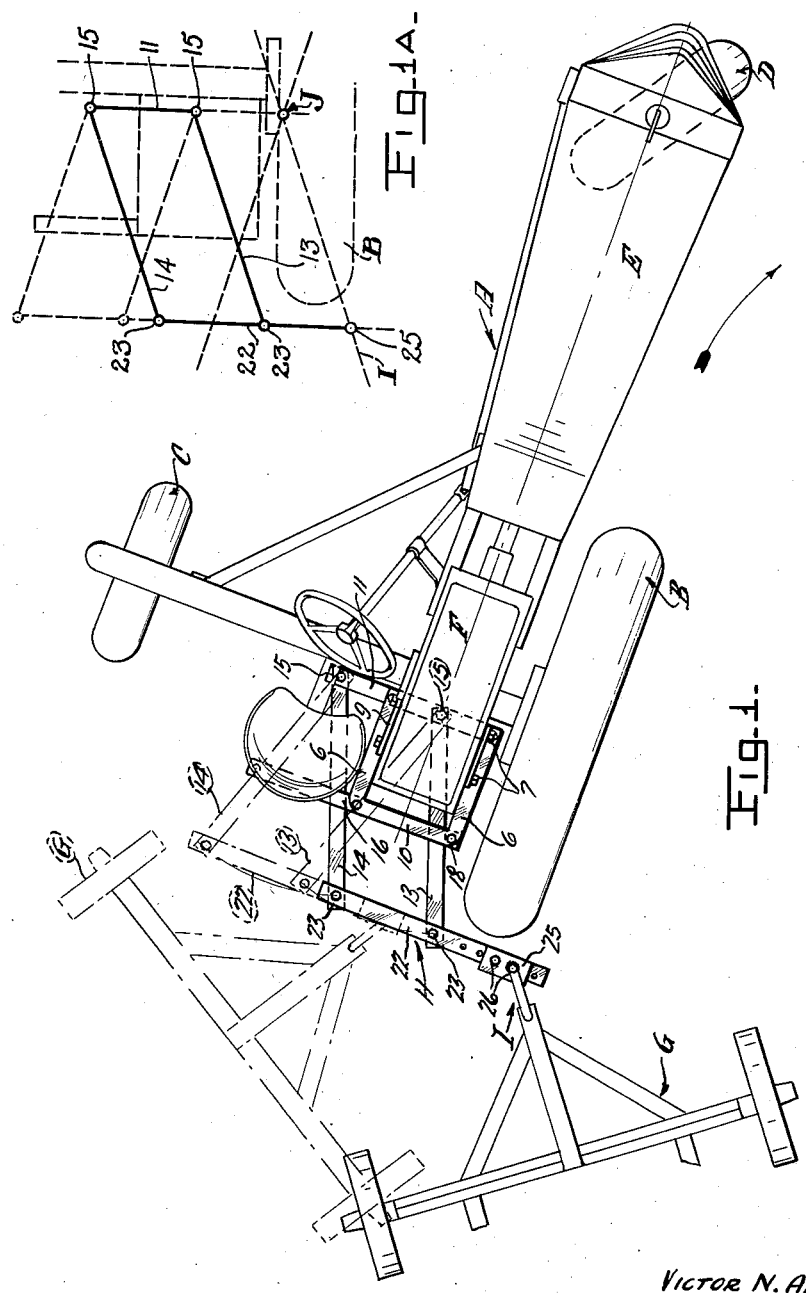
Fig. 1A is a diagrammatic view illustrating how the hitch parts operate to effectively extend the line of draft through a point spaced laterally with respect to the forward points of hitch connection to the tractor.
Figure 2:
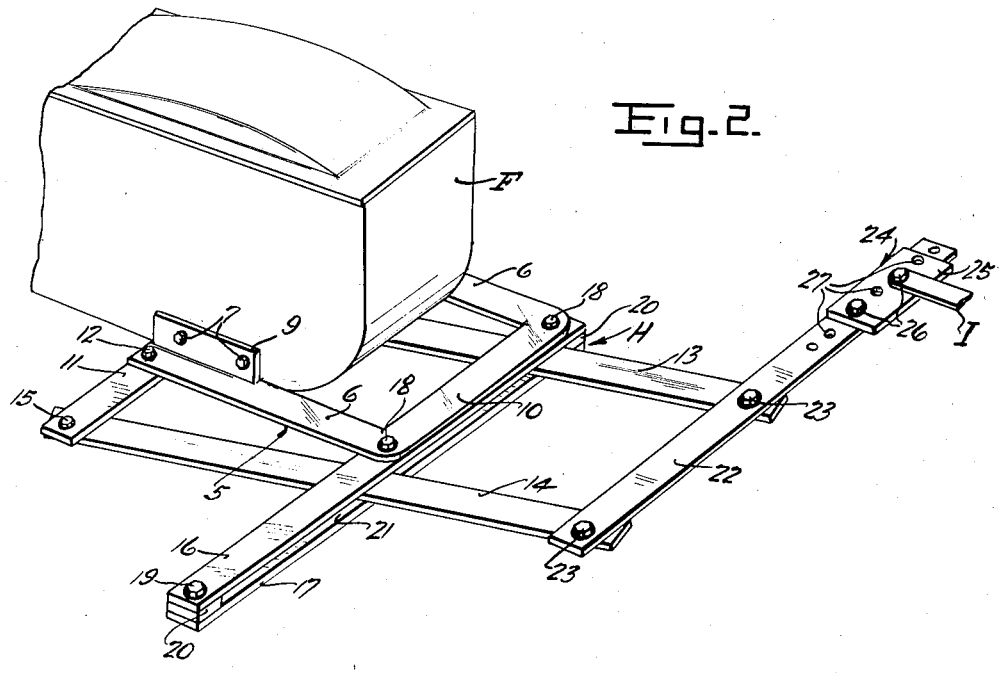
Fig. 2 is an enlarged perspective view of the hitch shifted to the right and showing a part of the tractor transmission housing to which the hitch is secured.
Figure 3:
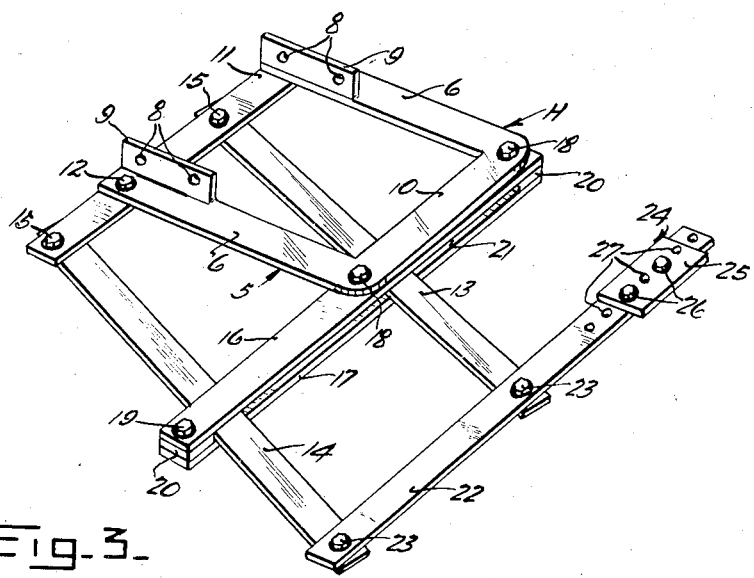
Fig. 3 is a similar perspective view of the hitch detached from the tractor and shifted to the left.

Referring now with more particularity and by reference characters to the drawings, A designates a tractor having a large rear traction wheel B, a laterally spaced, outrigger supported side wheel C and a frontal dirigible wheel D. The tractor further includes the power unit of any desired type located within the hood E and driving the traction wheel B through suitable gearing enclosed in the gear housing or transmission case F. The particular tractor illustrated forms the subject matter of an application for patent, Serial No. 216,986, filed July 1, 1938, of which I am co-inventor, and reference may be had to this application for further details of the tractor construction. It is to be understood, however, that I do not necessarily limit myself to the use of my hitch with this particular type of tractor, although I have found from experience that the hitch is particularly advantageous for this use. The hitch may, of course, be used in connection with any type of implement, such as indicated generally at G, to be drawn by the tractor.

The hitch itself is designated generally at H and comprises several coordinated working and mounting parts which will now be described. In constructing my hitch I provide first a mounting member or yoke 5 made up of flat, bar stock bent to a substantially U-shaped form having spaced parallel legs 6 adapted to embrace the sides of the housing F and to be secured thereto by bolts or screws 7 threaded into the housing through apertures 8 in the upwardly turned flanges 9 welded to, or turned integrally from, the ends of the said legs. These flanges are located at the inner margins of the legs 6 and support the yoke assembly in a horizontal plane slightly below the lower face of the housing F and with the bar 10 of the yoke thus extended rearwardly from the housing transversely to the tractor itself.

A cross bar 11 is secured transversely across the frontal ends of the yoke legs 6 by bolts 12, and extends outwardly at one end from the yoke, at the side opposite the traction wheel B. A pair of parallel acting draft bars 13 and 14 have their frontal ends pivotally connected by bolts 15 to the cross bar 11 and extend rearwardly therefrom beyond and below the yoke bar 10 and to a point spaced rearwardly with respect to the wheel B. The pivot bolts 15 for the draft bars 13 and 14 are located, respectively, midway between the frontal ends of the yoke legs 6 and laterally outward from the yoke by a distance equal to the distance between the intervening leg and the first mentioned pivot. In other words, the pivotal connections for the draft bars are each equidistant from the intervening yoke leg and are spaced apart by a distance substantially equivalent to the width of the yoke.

Extended transversely at the rear of the yoke are the two guide bars 16 and 17 which are secured beneath the bar 10 by the bolts 18 and extend laterally at one end from the yoke on the side opposite the traction wheel B by a distance substantially twice the corresponding projection of the cross bar 11. The outer extended ends of the guide bars 16 and 17 are secured together by bolts 19, and spacers 20 are disposed between the bars at the bolts 18 and 19 to the end that the bars will be spaced apart vertically to form an intervening transverse slideway or guide slot 21 through which the draft bars 13 and 14 may slidably extend.

A hitch bar 22 is extended transversely at the rear of the draft bars 13 and 14 and pivotal connections are made between these parts by bolts 23 spaced lengthwise of the hitch bar by a distance equal to that between the bolts 15 at the frontal ends of the draft bars. The hitch bar extends laterally at one end, but in this case toward the traction wheel B, and at its outer end carries a hitch connection 24 which may take the form of a plate 25 bolted at 26 to the bar and adapted for connection by any suitable means, as by the tongue or draw bar I, to the implement G. Adjustment of the hitch connection transversely of the tractor and along the length of the hitch bar 22 may be had by the provision of a series of equally spaced apertures 27 in both the bar and the plate 25 for the selective reception of the bolts 26, in a well known manner.

The foregoing construction provides an assembly wherein the draft bars 13 and 14 have a parallel link action such that the hitch bar 22, while capable of being readily shifted transversely behind the tractor toward either side, is maintained at all times parallel to the transverse axis of the tractor and at substantially constant spacing behind the tractor. The shifting motion of the hitch bar is limited by contact of the draft bars 13 and 14 with the stops at the ends of the guideway 21, as will be apparent.

In the normal straightaway operation of the tractor the pull of the implement is carried by the hitch bar substantially at the rear of the traction wheel B, or slightly to the inner side thereof, so that the strain has no lateral shifting effect on the tractor. When, as a turn is made to the right, as shown in Fig. 1 and Fig. 1A, the resulting angular pull of the implement, as the tractor assumes an angular relation to the path of the implement, will act to shift the hitch bar 22 toward the right and toward the inside of the turn. As a result the pull of the implement in no way interferes but rather assists in making the turn, since the tendency of the frontal end of the tractor is to be shifted in the direction of the turn rather than in the opposite direction, as would be the case where a rigid hitch is employed and connected to the housing F. When making a turn in the other direction, the hitch bar is shifted to the left or toward the inside of the turn, and the same beneficial result obtains. However, in this case the shift is not as great, and does not need to be, since the drive of the traction wheel B will oppose any lateral shifting of the tractor due to pull of the implement. Thus, in making a turn to the right, where the traction effect of the wheel B is least, the implement hitch is shifted actually to a point inwardly of the wheel (with respect to the arc of the turn) to give the greatest aid in making the turn, while in making a turn to the left where the traction effect of the wheel B is greatest, the hitch shift is made only to a point substantially in alignment with the center line of the tractor, the shift being in each case, however, toward the inner side of the turn. In either event the transverse shifting action is limited to a range sufficient for its purpose and to the point that the hitch will not, at any time, come into engagement with the wheels or other working parts of the tractor. At the same time the spacing between tractor and implement is maintained substantially at a constant distance due to the parallel link assembly used.

To assist in a more complete understanding of the action and advantages of the hitch it may be explained that the quadrangular linkage arrangement 11, 13, 14, 22 causes the point of draw bar (I) pull to swing from a vertical axis J (see Fig. 1A) that is substantially coincident with the spot of drive wheel contact with the ground. This is not a physical pivot, as the body position of the wheel precludes such a pivot, but the axis of oscillation is nevertheless very much present and remains constant even when the tractor and implement are angled with respect to each other. This will be understood from a consideration of Fig. 1A, in which it will be seen that as the draft bars 13 and 14 swing from the centers 15, causing pivots 23 to move in eccentric arcs, so too will they cause the hitch 25 (or implement connections I) to move in a similar arc described from an imaginary yet fixed vertical axis J which is spaced laterally from the right pivot 15 the same distance as the transverse spacing between the draw bar connection I and the right hand pivot 23. By this arrangement it will become obvious that the implement pull or resistance will, within the limit of movement permitted by the stops 20, be from a vertical axis through or at least very close to the space occupied by the traction wheel B, depending upon the adjustment made in the draw bar connection I, and consequently the implement resistance will at no time exert a biasing drag that can in any way unfavorably interfere with steering or operation of the tractor.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In combination with a tractor having a single laterally disposed rear traction wheel, a draft assembly for connecting an implement behind the tractor, the same comprising a transverse hitch bar having at one end and at a point normally in rear of the traction wheel a draft connection for the implement, and parallel connected members extended between the tractor and the bar and supporting the latter for transverse shifting movement behind the tractor in response to angular force exerted on the bar by the drawn implement.

2. In combination with a tractor including a traction wheel disposed laterally, a draft assembly for pulling an implement behind the tractor and comprising, a transverse hitch bar connected at one end and at a point substantially behind the traction wheel to the implement, parallel members pivotally connected to the tractor inwardly of the traction wheel and connected rearwardly to the hitch bar and supporting the same for transverse movement.

3. In combination with a tractor having a single laterally disposed traction wheel, a draft device for connecting an implement to the tractor and comprising spaced draft bars pivotally connected to the tractor at transversely spaced points laterally of the said wheel and extended rearwardly from said points, a hitch bar pivotally connected to rear portions of the draft bars and supported thereby for transverse shifting action behind the tractor, the said hitch bar having a hitch connection at one end extending laterally of the tractor and outwardly toward a point rearwardly of the said wheel.

4. In combination with a tractor of the type driven by a single laterally disposed traction wheel, a draft assembly for connecting an implement to the tractor and comprising a pair of draft bars pivotally connected to the tractor at transversely spaced points thereon, one of the said pivotal points disposed adjacent the fore and aft axis of the tractor and the other being spaced therefrom to the side opposite from the said wheel, the said draft bars being extended rearwardly, a hitch bar pivotally connected to the rear ends of the draft bars and extended with one end in a horizontal transverse plane for shifting movements outwardly at said end behind the said wheel, and means for connecting a drawn element to said extended end of the hitch bar.

5. In combination with a tractor having a traction wheel disposed laterally, a draft assembly comprising a pair of draft bars pivotally connected to the tractor at transversely spaced points and extended in parallel relation rearwardly therefrom for swinging movement in a transverse, horizontal plane, and a hitch bar pivotally connected to the rear ends of the draft bars and extended endwise from the bars toward the traction wheel, and an implement connecting means at the extended end of the hitch bar.

6. In combination with a tractor having a traction wheel disposed laterally, a draft assembly comprising a pair of draft bars pivotally connected to the tractor at transversely spaced points and extended in parallel relation rearwardly therefrom for swinging movement in a transverse, horizontal plane, and a hitch bar pivotally connected to the rear ends of the draft bars and extended endwise from the bars toward the traction wheel, and a transversely adjustable implement connecting means at the extended end of the hitch bar.

7. In combination with a tractor having a traction wheel disposed laterally, a draft assembly comprising a pair of draft bars pivotally connected to the tractor at transversely spaced points and extended in parallel relation rearwardly therefrom for swinging movement in a transverse, horizontal plane, the said draft assembly having a transversely extended guideway for the draft bars, and a hitch bar pivotally connected to the rear ends of the draft bars and extended endwise from the bars toward the traction wheel, and an implement connecting means at the extended end of the hitch bar.

8. In combination with a tractor having a traction wheel disposed laterally, a draft assembly comprising a pair of draft bars pivotally connected to the tractor at transversely spaced points and extended in parallel relation rearwardly therefrom for swinging movement in a transverse, horizontal plane, the said draft assembly having a transversely extended guideway for the draft bars, and a hitch bar pivotally connected to the rear ends of the draft bars and extended endwise from the bars toward the traction wheel, an implement connecting means at the extended end of the hitch bar, and means in the said guideway for limiting the said transverse swinging movement of the draft bars to the point that the said hitch connection may shift from a position substantially in alignment with the fore and aft axis of the tractor to a position outwardly of the said wheel.

9. A hitch for connecting an implement to a tractor, comprising a pair of draft bars pivotally connected to the tractor at transversely spaced points and in extended parallel relation rearwardly therefrom for swinging movement in a transverse, horizontal plane, guide means for the said bars, a hitch bar pivotally connected to the rear ends of the draft bars and supported thereby for transverse shifting movement behind the tractor, and an implement connecting means on the said hitch bar.

10. A hitch for connecting an implement to a tractor, comprising a yoke secured to the tractor, a cross bar secured to the yoke and extended transversely, a pair of draft bars pivotally connected to the cross bar at transversely spaced points and extended in parallel relation rearwardly therefrom, vertically spaced guide bars secured transversely to the yoke and embracing the draft bars which extend slidably therebetween, a hitch bar extended transversely at the rear ends of the draft bars and pivotally connected thereto at spaced points, the said hitch bar being extended at one end from the draft bars, and an implement hitch attached to the hitch bar at the extended end thereof.

11. In combination with a tractor having a single traction wheel, a draft assembly comprising a pair of draft bars pivotally connected at front ends to the tractor and extending rearwardly therefrom for transverse swinging movement, means engageable with the draft bars at a position rearwardly of said pivot connections to support the bars for said swinging movements, a hitch member pivotally secured to the rear ends of the bars and extending with one end laterally therefrom, and means for connecting a drawn implement or vehicle to said extended end of the hitch member.

12. In combination with a tractor having a single traction wheel, a draft assembly comprising a pair of draft bars pivotally connected at front ends to the tractor and extending rearwardly therefrom for transverse swinging movement, means engageable with the draft bars at a position rearwardly of said pivot connections to support the bars for said swinging movements, a hitch member pivotally secured to the rear ends of the bars and extending with one end laterally therefrom, means for connecting a drawn implement or vehicle to said extended end of the hitch member, and means for limiting the transverse swinging movements of the draft bars.

13. A hitch for connecting an implement or vehicle to a tractor comprising a pair of draft bars pivotally connected at forward transversely spaced points to the tractor for swinging movements in transverse directions, guide means forming a support for the bars intermediate the ends thereof, a hitch bar pivotally connected to the rear ends of the draft bars and supported thereby for transverse shifting movement behind the tractor, said hitch bar being extended at one end laterally beyond the adjacent draft bar, and means for connecting the implement or vehicle to said extended end of the hitch bar, said draft bars, hitch bar, and connecting means being so constructed and arranged that the line of draft extends through a point in line with but laterally offset from said first mentioned points.

14. A hitch for a tractor of the type having a single, laterally disposed, traction wheel, comprising a pair of substantially parallel fore and aft extending links, pivoted at their front ends to the tractor, and a hitch member pivotally supported, by spaced pivots, to the respective rear ends of the links, said hitch member having a point of draft application offset laterally with respect to both links and in the direction of the traction wheel side of the tractor, said links and hitch member being so constructed and arranged that the line of draft through said point of draft application extends through another point in line with but laterally offset from said pivots connecting the front ends of the links to the tractor.

VICTOR N. ALBERTSON.